United States Patent
Grassiotto

(10) Patent No.: US 8,611,866 B2
(45) Date of Patent: Dec. 17, 2013

(54) SYSTEM AND METHOD FOR PROVIDING USER AWARENESS IN A SMART PHONE

(75) Inventor: Fabio Grassiotto, Vancouver (CA)

(73) Assignee: Core Wireless Licensing, S.a.r.l., Luxembourg (LU)

(*) Notice: Subject to any disclaimer, the term of this patent is extended or adjusted under 35 U.S.C. 154(b) by 1229 days.

(21) Appl. No.: 11/104,098

(22) Filed: Apr. 12, 2005

(65) Prior Publication Data
US 2006/0234686 A1    Oct. 19, 2006

(51) Int. Cl.
   H04M 3/42    (2006.01)
   H04W 24/00   (2009.01)
   H04M 1/00    (2006.01)
   H04W 68/00   (2009.01)
   H04B 1/38    (2006.01)
   H04L 29/08   (2006.01)
   H04W 4/02    (2009.01)

(52) U.S. Cl.
   CPC ........... *H04L 29/08108* (2013.01); *H04W 4/02* (2013.01)
   USPC ............... 455/414.1; 455/456.3; 455/566; 379/355.05; 379/356.01; 348/207.1; 705/35; 715/234; 715/853

(58) Field of Classification Search
   USPC ............... 707/3; 455/456.3, 414.1, 418, 566; 705/1, 35, 36, 306, 36 R; 348/207.1; 379/355.05, 356.01; 715/234
   See application file for complete search history.

(56) References Cited

U.S. PATENT DOCUMENTS

| | | | | |
|---|---|---|---|---|
| 5,305,205 A | * | 4/1994 | Weber et al. | 715/234 |
| 5,568,546 A | * | 10/1996 | Marutiak | 379/355.05 |
| 6,243,459 B1 | * | 6/2001 | Cannon et al. | 379/356.01 |
| 6,266,060 B1 | * | 7/2001 | Roth | 715/853 |
| 6,535,243 B1 | * | 3/2003 | Tullis | 348/207.1 |
| 6,820,075 B2 | * | 11/2004 | Shanahan et al. | 707/3 |
| 7,054,649 B2 | * | 5/2006 | Yamazaki et al. | 455/456.3 |
| 7,103,556 B2 | * | 9/2006 | Del Rey et al. | 705/36 R |
| 2004/0162773 A1 | * | 8/2004 | Del Rey et al. | 705/36 |
| 2006/0030370 A1 | * | 2/2006 | Wardimon | 455/566 |
| 2006/0084478 A1 | * | 4/2006 | Erlichmen | 455/566 |
| 2006/0106703 A1 | * | 5/2006 | Del Rey et al. | 705/35 |
| 2006/0234686 A1 | * | 10/2006 | Grassiotto | 455/414.1 |

FOREIGN PATENT DOCUMENTS

EP    0891066    1/1999

OTHER PUBLICATIONS

History of Microsoft'S Windows by Wikipedia printed on Mar. 16, 2010.*
Screen Shots of Windows XP, printed on Mar. 16, 2010.*
Screen Shots of Netscape Communicator 4.75, printed Aug. 6, 2003.*

* cited by examiner

*Primary Examiner* — William D Cumming

(57) ABSTRACT

A system and method for providing a plurality of options to a mobile telephone user based upon the user's prior activities. The present invention includes an "action input," the actuation of which results in a menu of previously performed activities by the user. For example, the menu can display activities that frequently occur at the same time each day. The device software can automatically update and arrange the respective options based upon the user's activities.

19 Claims, 4 Drawing Sheets

SYSTEM AND METHOD FOR PROVIDING
USER AWARENESS IN A SMART PHONE

FIELD OF THE INVENTION

The present invention relates generally to mobile telephones. More particularly, the present invention relates to "smart" mobile telephones that are capable of monitoring a user's activities.

BACKGROUND OF THE INVENTION

Smart phones are the next generation in cellular telephony. With extraordinary computing power, built-in programmable graphics, and various communication options, smart phones provide a convenient and powerful mobile user interface for many intelligent embedded devices. Individuals can use a smart phone to perform activities such as connecting to security systems, industrial controllers, access-control systems, medical devices, environmental systems, and other systems.

These devices are typically application-driven, allowing the user to select applications from a user interface screen and install new software. Smart phones use a direct manipulation of the user interface, meaning that the user is required to select iconic representations in order to select software applications in the device. Smart phone applications also contain a menu structure with a number of options for the user selection.

As cellular telephony networks mature, devices within these networks are becoming increasingly capable of implementing connections with higher data-rates. These devices are also becoming increasingly capable of establishing data communication operations for internet-aware applications, such as browsing, multimedia messaging, chat operations, and other operations.

Although the level of technology being incorporated into smart phones is increasing every year, they still have a number of limitations. For example, as smart phones have increasingly complex user interfaces, they are still quite limited in their ability to make it easier for a user to manipulate them. Typically, the user is often required to perform the same actions repeatedly without any support from the smart phone software, with the software not aiding users in making frequent actions easier to complete, as well as not permitting significant customization of the user interface.

In recent years, some smart phones have permitted minor customizations of the user interface to take place. These customizations have included the selection of themes, language selection and similar settings. Although beneficial, these customizations are still limited and do not seriously monitor and adjust to a user's everyday activities.

European Patent Publication No. 0891066A2, assigned to Nokia Mobile Phones LTD., discloses an electronic device where a menu can be created that includes the most commonly implemented functions by a user. However, the user must still navigate through the user interface to reach the menu.

SUMMARY OF THE INVENTION

The present invention involves the use of an "action input" that provides a user with a number of options according to the current time of the day or the last-run application on the mobile telephone. For example, when a user actuates the action input at a certain time of day, the device will show a list of options to the user that are based upon the user's activities at the same time previous days. The list of options can also be ranked by the frequency of user action. The software for the device can also provide automatic customization of the options based upon usage statistics. This customization can include, for example, changing the order of icons in the principal display, reordering options in the respective menus, reordering Internet links in browser software, and others.

The present invention represents a substantial improvement in smart phone technology over conventional systems. The present invention allows for the customization of option lists for different users and for different situations. This invention would be especially advantageous with systems having an "active idle" mode, where users can receive and manipulate information even though the device is in an idle mode. The present invention can also be implemented on computers having an "active desktop" function. These benefits have previously not been available in smart phones.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

Figure 1:
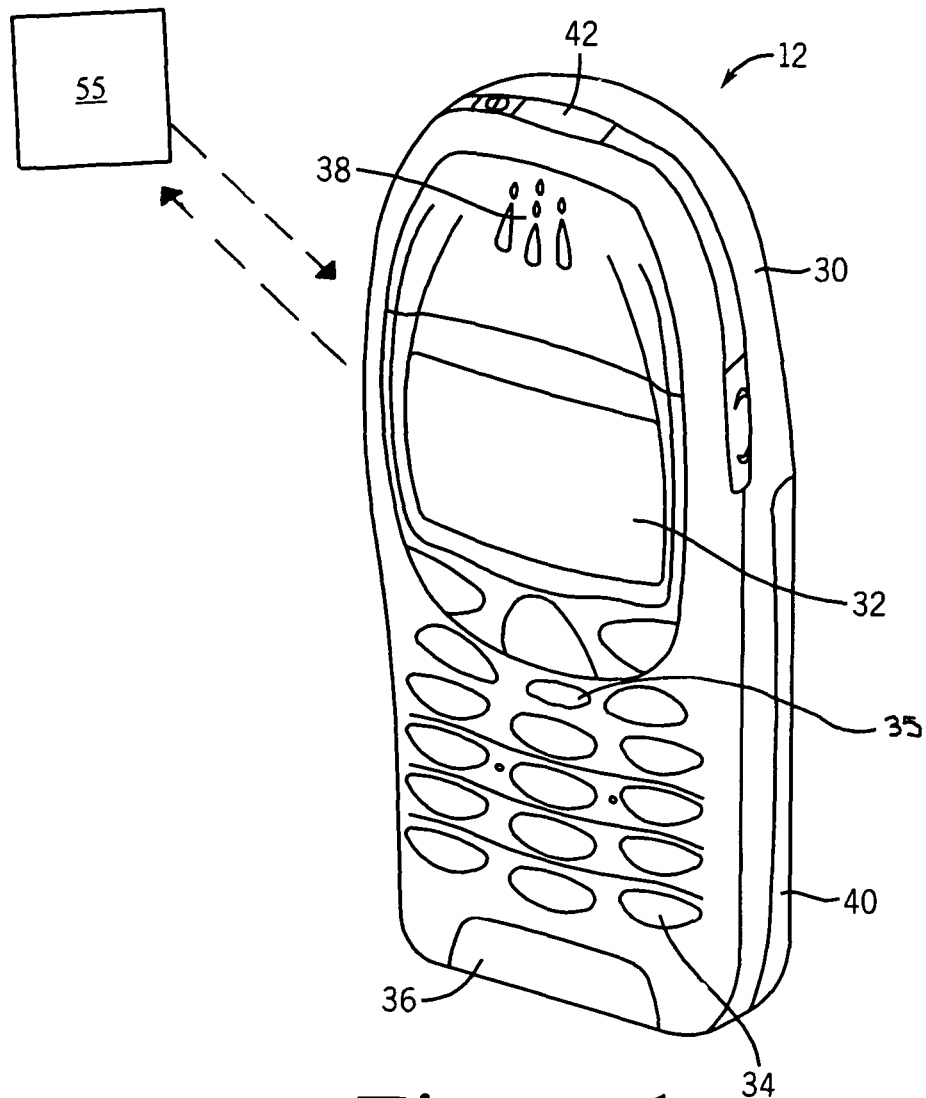
FIG. 1 is a perspective view of a mobile telephone that can be used in the implementation of the present invention.
Figure 2:
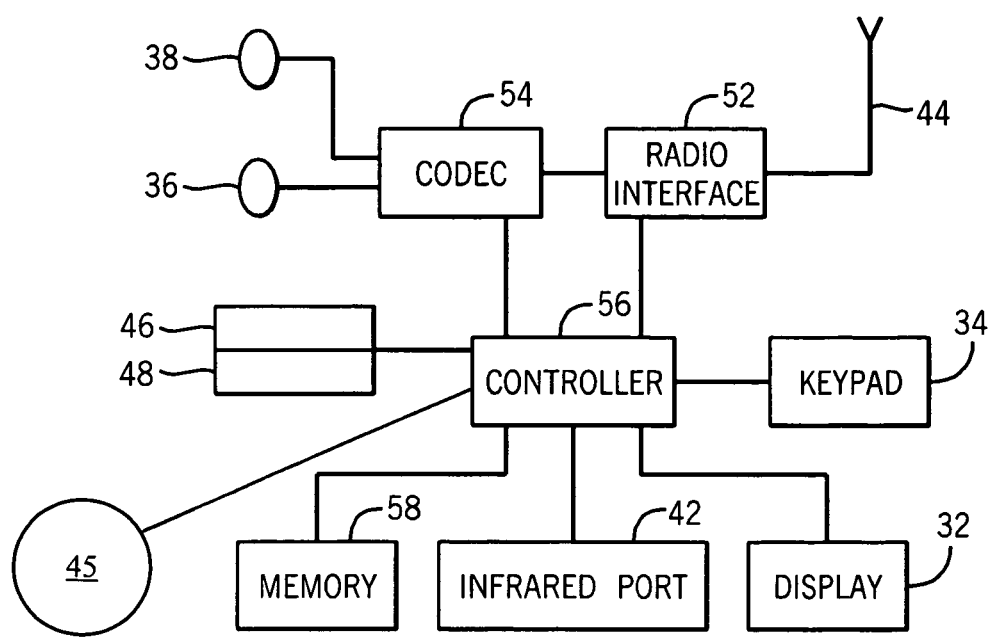
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. For example, the present invention can be incorporated into a combination personal digital assistant (PDA) and mobile telephone, a PDA, an integrated messaging device (IMD), a desktop computer, and a notebook computer. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a system clock 43, a card reader 48, radio interface circuitry 52, codec circuitry 54, a controller 56 and a memory 58. Individual circuits and elements are all of a type well known in the art, for example in the Nokia range of mobile telephones.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc.

The present invention takes advantage of the fact that a typical user's usage patterns of the smart phone device are well defined. For example, many people call their home at the same time of the day, send short messages to the same friends at the same time on a certain day of the week, open the same internet links using a web browser, etc. However, for these types of frequent actions, the user is usually required to do repeated actions without any support from the smart phone's software in conventional systems. The fact that the usage patterns of the device are well defined is used by the smart phone software in the present invention to provide a mechanism for the user to repeat frequent actions and customize the user interface to accommodate these actions. The present invention also provides for a number of features for permitting a task-driven approach to smart phones.

The present invention involves the use of an "action input," shown at 35 in FIG. 1, that activates user awareness systems, providing the user with a number of options in the user interface. Although the action input 35 is shown in FIG. 1 as being a button located below the display 32, it should be noted that the action input 35 can take a wide variety of forms. For example, in the case where the display 32 is touch sensitive, the action input 35 can take the form of an icon on the display 32, where the user can actuate the icon through the use of a stylus or other device.

Figure 3:
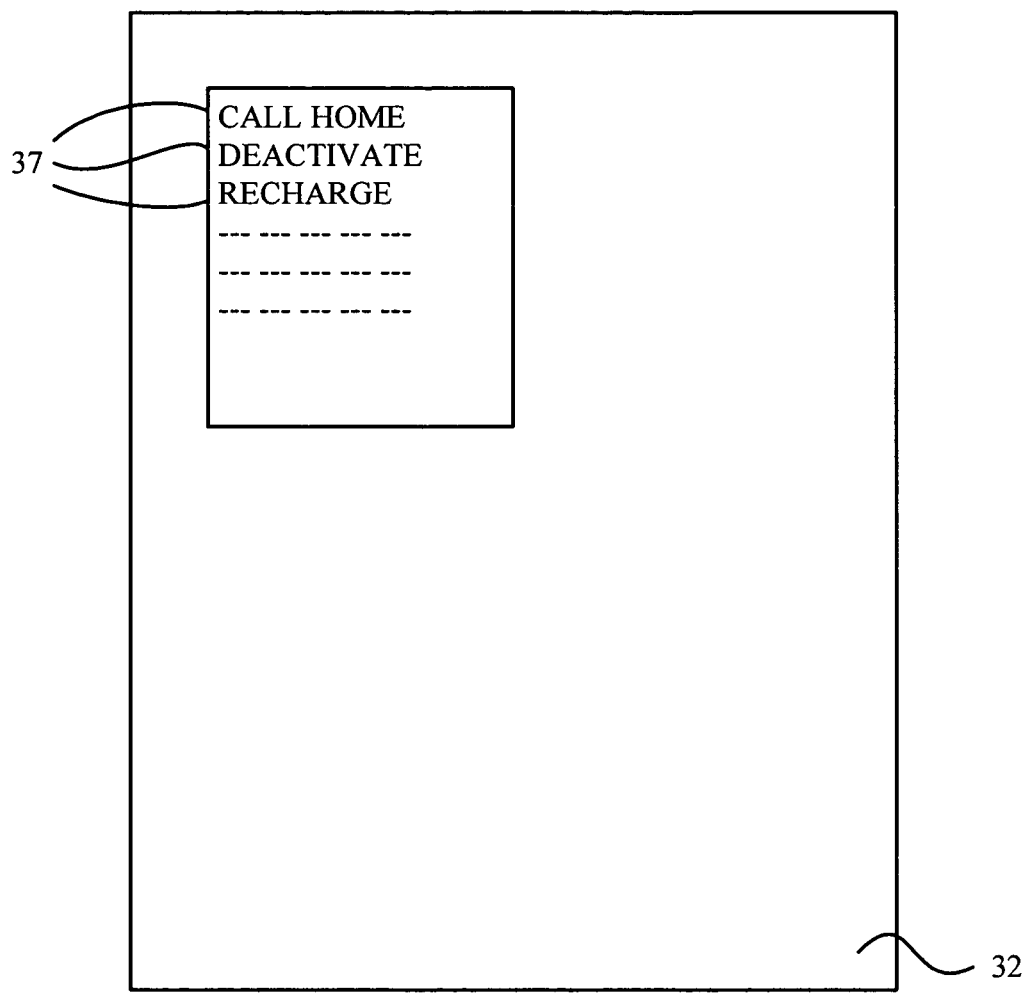
FIG. 3 is a representative display showing a list of potential actions to be implemented by the user based upon the user's prior conduct.

According to the present invention, activation of the action input 35 provides the user with a set of potential options on the display 32 that are customized based upon the user's prior conduct. In one embodiment of the invention, when the action input 35 is actuated, the set of options that are provided to the user are based upon the user's prior conduct at that particular time of day. For example, if at 5:30 in the afternoon the user actuates the action input 35, then the display 32 will exhibit a list of options to the user based upon his or her actions at 5:30 in the afternoon on previous days. Items such as "call home," "turn off device," and virtually any other activity could be listed. This is represented generically in FIG. 3, with a list of options 37 being listed on the display 32.

The present invention may be particularly useful with systems having an "active idle" mode, where users can receive and manipulate information even though the device is in an idle mode. An idle mode in a mobile telephone is a basic mode where a user can, for example, initiate a phone call or other functions. An idle mode may also present information, such as upcoming calendar events, missed or received calls and/or other information that might be of interest to the user. As used herein, the term "idle mode" refers to a mode where the system, though possibly appearing in an inactive state, will react to activity generated by the electronic device. This is in contrast to programs such as "screen savers," where events generated by the electronic device do not have an effect on the screen saver or cause the screen saver to disappear or stop operating. Computers and other electronic devices can also have an idle mode.

In the situation where the present invention is used in conjunction with an active idle mode, the user is not required to browse through any menus or long lists of items. When potential actions are presented on the screen in the active idle mode, the actions act as reminders to the user. The reminder itself may also act as a shortcut to the action.

In another embodiment of the invention, the options that are displayed are based upon the last application which was used by the user. For example, if the last action involved the use of electronic mail, then actuation of the action input 35 would result in the display of frequently used electronic mail addresses.

It is also possible for the mobile telephone 12 to rank the individual options based upon the frequency at which the actions are conducted by the user at that time. In this way, the mobile telephone 12 can use usage statistics not only to display likely potential actions, but also to customize the ordering of such actions based upon a user's prior tendencies. This customization can involve not only the potential action items, but can also affect the order and arrangement of icons appearing on the display 32; items and options appearing in web browsers and other applications, and other items that are commonly manipulated on the mobile telephone 12. In one embodiment of the invention, all of the above-described functionalities are optional to the user, allowing the user to turn on and off the functionality as necessary and/or desired.

According to one embodiment of the present invention, the software for the mobile telephone 12 logs the user's activity, including the number of occasions each application is activated, the data that the user inputs into the various applications, and similar information. In one embodiment of the invention, all of the collected data is stored in a secure database 45 within the mobile phone's software in order to address privacy and security concerns. In a particular embodiment, the database 45 can be securely moved between smart phone devices so that when the user purchases a new mobile telephone 12, the user's usage statistics could be transferred between devices. When the user activates the action input 35, the database 45 is accessed and a set of options are displayed to the user through the use of the data that was previously logged. The smart phone software can access the database 45 continuously in order to customize the user interface/display 32, limit the database size and refresh data. The size of the database 45 can also be limited in order to comply with small memory sizes.

In one particular embodiment of the present invention, the mobile telephone 12 can connect to a remote server, represented at 55 in FIG. 1, in a secure manner using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, and others. Using these types of communication methods, the mobile telephone 12 or other device can upload usage statistics for later usage or storage. Such an uploading procedure using a database within the server 55 or in another device connected to the server 55 can be triggered automatically and without user intervention, or with user intervention, in which case the user can register its usage statistics with a particular user profile. This user intervention can be facilitated, in one embodiment of the invention, by a user profile application that allows the user to manage his or her profile, set visibility rules and upload or download to and from the database. The user profile can then be used as a shared database in the event that the user wants to use more than mobile phone 12 or other device. By sharing the database between devices, the user interface for the devices owned by a user can be customized with the same set of rules, allowing for personalized and unique device usage. In a particular embodiment of the invention, the local database in the mobile telephone 12 or other device is synchronized with the remote database on a frequent basis to avoid data loss.

In one embodiment of the invention, such as where the mobile telephone 12 or other device is operating in a high-speed, always connected 3G environment, the mobile telephone does not need to maintain the secure database locally in the device, but instead maintains the database remotely, and data parsing can be performed in the server environment. The mobile telephone 12 or other device can then retrieve the customized options and user interface settings through a network connection using a proprietary protocol. This particular embodiment of the invention removes the burden of storing a large database in the device at issue and forcing the device to parse through the database as the device's complexity grows.

In another particular embodiment of the present invention, when the database is stored remotely, new server-based applications can be created that make use of particular usage statistics, such as finding other user profiles that use the same applications. Through a visibility setting, the network provider can provide new services to the user that require such services. For example, the network provider can provide buddy lists, most frequently used applications, etc. to the user.

Figure 4:
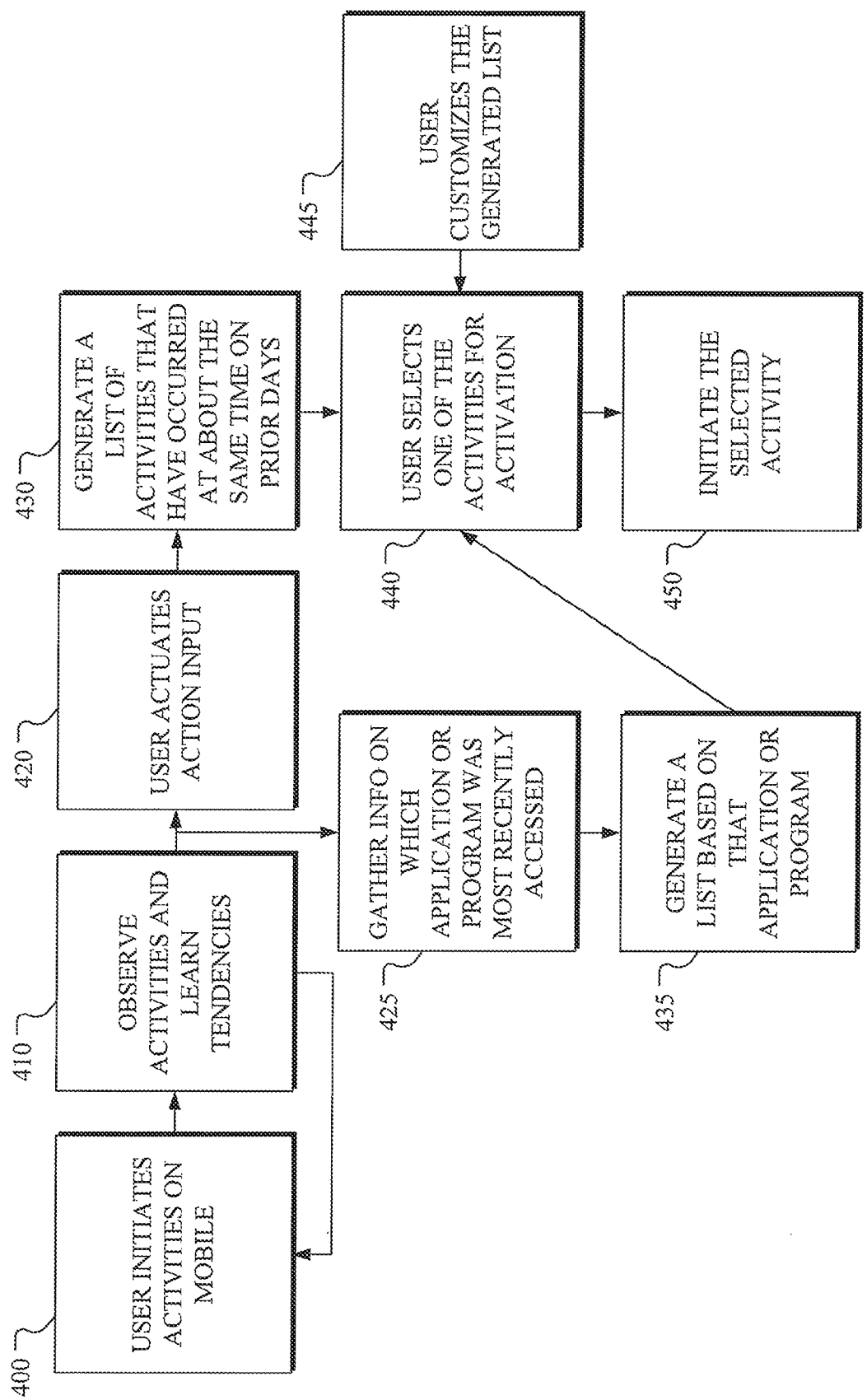
FIG. 4 is a flow chart showing the implementation of various embodiments of the present invention.

FIG. 4 is a flow chart showing the implementation of one embodiment of the present invention. At step 400, a user initiates an activity on his or her mobile telephone 12. At step 410, the system database 45 observes this activity and takes note of the nature of the activity, as well as the time that the activity occurs. Steps 400 and 410 repeat over time, resulting in the database 45 "learning" the tendencies of the user. At step 420, at some later point the user actuates the action input 35. In response to this actuation, the mobile telephone 12 accesses the database 45 and gathers information concerning the nature and timing of the prior activities. At step 430, the mobile telephone 12 generates a list of those activities (which can be as short as only one activity) that have occurred around the same time on previous days. In one embodiment of the invention, the user or the device itself can define a time span for categorizing this information. For example and depending upon the user or device settings, if a user calls home at 4:45 P.M., 5:05 P.M., and 5:15 P.M., all of these calls can all be categorized as occurring around 5:00 P.M. In such a case, for example, a "call home" message can appear from 4:45 P.M. to 5:15 P.M. on subsequent days. At step 440, the user selects one of the activities for activation and, at step 450, the mobile telephone 12 initiates the selected activity.

In another embodiments of the invention, the mobile telephone gathers information concerning which application or program was most recently accessed. This step is represented at step 425 and, at step 435, a list is generated based upon activities associated with that application or program. It should also be noted that steps 420, 430, 425 and 435 can all occur substantially simultaneously, resulting in the most common activities in recent days for a particular application to be exhibited on the display 32.

In yet another embodiment of the invention, at step 445, the user can customize the generated list. For example, the user can add activities so that they always appear on the list when the action input 35 is actuated, or the user can change the respective ranking of individual activities on the list. It should be noted that this customization can occur at various points in the process depicted in FIG. 4. Additionally, the user can also apply tags to the frequently used action so that the mobile telephone 12 or other device can display the tag whenever the action button/application is initiated.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
monitoring, by a processor of an electronic device, a plurality of actions undertaken by a user on the electronic device over a period of time;
recording information concerning the nature of the plurality of actions, including the time of day that the plurality of actions occurred;
receiving a user activation input;
in response to receiving the user activation input, generating, by the processor, a list of actions from the plurality of actions that occurred within a time span around the same time of day as the user activation input but on previous days, the actions on the list being ranked in order of frequency at which the actions were previously undertaken during the time span on the previous days; and
presenting the list to the user of the electronic device.

2. The method of claim 1, wherein the list of actions are generated when the electronic device is in an idle mode.

3. The method of claim 1, further comprising:
permitting the user to select from the list of actions; and performing the selected action.

4. The method of claim 1, wherein the information is recorded on a database removably connected to the electronic device.

5. A computer program product, embodied in a non-transitory computer-readable medium and executed by a processor, comprising:
computer code for monitoring a plurality of actions undertaken by a user on the electronic device over a period of time;
computer code for recording information concerning the nature of the plurality of actions, including the time of day that the plurality of actions occurred;
computer code for receiving a user activation input;
computer code for generating, in response to receiving the user activation input, a list of actions from the plurality of actions that occurred within a time span around the same time of day as the user activation input but on previous days, the actions on the list having a relationship with time being ranked in order of frequency at which the actions were previously undertaken during the time span on the previous days; and computer code for presenting the list to the user of the electronic device.

6. The computer program product of claim 5, wherein the list of actions are generated when the electronic device is in an idle mode.

7. The computer program product of claim 5, further comprising:
computer code for permitting the user to select from the list of actions; and computer code for performing the selected action.

8. An electronic device, comprising:
a processor;
a display for exhibiting information generated by the processor; and
a memory unit operatively connected to the processor, the memory unit including computer code configured to, with the processor, cause the electronic device at least to perform:
monitor a plurality of actions undertaken by a user on the electronic device over a period of time;
record information concerning the nature of the plurality of actions, including the time of day that the plurality of actions occurred;
receive a user activation input;
in response to receiving the user activation input, generate a list of actions from the plurality of actions that occurred within a time span around the same time of day as the user activation input but on previous days, the actions on the list being ranked in order of frequency at which the at least one of the plurality of actions were previously undertaken during the time span on the previous days; and
present the list to the user on the display.

9. The electronic device of claim 8, wherein the information is recorded on a database removably connected to the remainder of the electronic device.

10. The electronic device of claim 8, wherein the memory unit further includes:
computer code for permitting the user to select from the list of actions; and
computer code for performing the selected action.

11. The electronic device of claim 8, wherein the list of actions are generated when the electronic device is in an idle mode.

12. The electronic device of claim 8, wherein the electronic device comprises a device selected from the group consisting of a mobile telephone, a personal digital assistant, a computer, and combinations thereof.

13. A system, comprising:
a processor;
a memory unit operatively connected to the processor; and
a database including:
computer code for monitoring a plurality of actions undertaken by a user over a period of time, and
computer code for recording information concerning the nature of the plurality of actions, including the time of day that the plurality of actions occurred,
wherein a list of actions is generated from the plurality of actions for exhibition to the user upon receipt of a user activation input, the actions on the list being ranked in order of frequency at which the actions were previously undertaken during a time span that occurred around the same time of day as the user activation input but on previous days.

14. The system of claim 13, wherein the database is located in a remote location from the processor and the memory unit.

15. A server, comprising:
a processor;
a data communication link to transmit and receive information to and from an electronic device; and
a memory unit operatively connected to the processor and including;
computer code for monitoring a plurality of actions undertaken by a user of the electronic device over a period of time, and
computer, code for recording information concerning the nature of the plurality of actions, including the time of day that the plurality of actions occurred,
wherein a list of actions is generated from the plurality of actions for exhibition to the user on the electronic device upon receipt of a user activation input, the actions on the list being ranked in order of frequency at which the actions were previously undertaken during a time span that occurred around the same time of day as the user activation input but on previous days.

16. The method of claim 1, wherein the time span satisfies a relationship criterion with respect to the current time.

17. The computer program product of claim 5, wherein the time span satisfies a relationship criterion with respect to the current time.

18. The electronic device of claim 8, wherein the time span satisfies a relationship criterion with respect to the current time.

19. The system of claim 13, wherein the time span satisfies a relationship criterion with respect to the current time.

* * * * *